(12) United States Patent
Madoglio et al.

(10) Patent No.: US 9,847,676 B2
(45) Date of Patent: Dec. 19, 2017

(54) POWER SAVING TECHNIQUE FOR DIGITAL TO TIME CONVERTERS

(71) Applicant: Intel IP Corporation, Santa Clara, CA (US)

(72) Inventors: Paolo Madoglio, Hillsboro, OR (US); Georgios Palaskas, Portland, OR (US); Bernd-Ulrich Klepser, Starnberg (DE); Andreas Menkhoff, Oberhaching (DE); Zdravko Boos, Munich (DE); Andreas Boehme, Schorndorf (DE); Michael Bruennert, Unterhaching (DE)

(73) Assignee: Intel IP Corporation, Santa Clara, CA (US)

( * ) Notice: Subject to any disclaimer, the term of this patent is extended or adjusted under 35 U.S.C. 154(b) by 1076 days.

(21) Appl. No.: 14/039,996

(22) Filed: Sep. 27, 2013

(65) Prior Publication Data
US 2015/0091384 A1   Apr. 2, 2015

(51) Int. Cl.
| | |
|---|---|
| *H04B 1/04* | (2006.01) |
| *H02J 17/00* | (2006.01) |
| *H04W 52/52* | (2009.01) |
| *H04W 52/02* | (2009.01) |
| *H04L 27/36* | (2006.01) |

(52) U.S. Cl.
CPC ............ *H02J 17/00* (2013.01); *H04B 1/0475* (2013.01); *H04L 27/361* (2013.01); *H04W 52/028* (2013.01); *H04W 52/0251* (2013.01); *H04W 52/52* (2013.01); *Y02B 60/50* (2013.01)

(58) Field of Classification Search
CPC ........ H04B 1/0475; H04L 25/03; H02J 17/00; H04W 52/0251; H04W 52/028; H04W 52/52

USPC ........................ 455/127.1, 127.2, 127.5, 139
See application file for complete search history.

(56) References Cited

U.S. PATENT DOCUMENTS

| | | | | |
|---|---|---|---|---|
| 8,676,161 | B2 * | 3/2014 | Phillips ............. | G06Q 20/3226 455/410 |
| 2004/0208260 | A1 * | 10/2004 | Chan ................... | H03G 3/3042 375/297 |
| 2007/0111679 | A1 * | 5/2007 | Thompson ........... | H04B 1/0475 455/114.1 |
| 2010/0087167 | A1 * | 4/2010 | Tsurutome .......... | H04L 67/2814 455/411 |
| 2011/0304357 | A1 * | 12/2011 | Tokairin ................... | H03K 5/26 327/12 |
| 2012/0098587 | A1 * | 4/2012 | Nakahara ......... | H03K 17/08122 327/425 |

(Continued)

FOREIGN PATENT DOCUMENTS

| | | |
|---|---|---|
| CN | 104519558 A | 4/2015 |
| DE | 102014014269 A1 | 4/2015 |

*Primary Examiner* — Md Talukder
(74) *Attorney, Agent, or Firm* — Schwegman Lundberg & Woessner, P.A.

(57) ABSTRACT

This document discusses apparatus and methods for reducing energy consumption of digital-to-time converter (DTC) based transmitters. In an example, a wireless device can include a digital-to-time converter (DTC) configured to receive phase information from a baseband processor and to provide a first modulation signal for generating a wireless signal, and a detector configured to detect an operating condition of the wireless device and to adjust a parameter of the DTC in response to a change in the operating condition.

20 Claims, 4 Drawing Sheets

(56) References Cited

U.S. PATENT DOCUMENTS

| | | | |
|---|---|---|---|
| 2012/0219088 A1* | 8/2012 | Friedrich | H04B 1/0475 375/296 |
| 2012/0286755 A1* | 11/2012 | Itou | H02M 1/36 323/284 |
| 2013/0095777 A1* | 4/2013 | Muhammad | H04W 52/52 455/127.2 |
| 2013/0171929 A1* | 7/2013 | Adams | H04W 4/008 455/41.1 |
| 2013/0214831 A1* | 8/2013 | Park | G04F 10/005 327/156 |
| 2013/0223564 A1* | 8/2013 | Mayer | H04L 25/03343 375/296 |
| 2014/0002287 A1* | 1/2014 | Klepser | H04L 27/2003 341/144 |
| 2014/0002288 A1* | 1/2014 | Scholz | H03M 1/66 341/144 |
| 2014/0010564 A1* | 1/2014 | Okubo | G03G 15/80 399/88 |
| 2014/0101036 A1* | 4/2014 | Phillips | G06Q 20/027 705/39 |
| 2014/0266822 A1* | 9/2014 | Henzler | G04F 10/005 341/118 |
| 2014/0376479 A1* | 12/2014 | Imamura | H04L 5/001 370/329 |
| 2015/0003502 A1* | 1/2015 | Menkhoff | H03M 3/438 375/219 |
| 2015/0049840 A1* | 2/2015 | Banin | H03M 1/66 375/297 |
| 2015/0091384 A1* | 4/2015 | Madoglio | H02J 17/00 307/104 |
| 2016/0286342 A1* | 9/2016 | Maddocks | G06Q 20/32 |

* cited by examiner

POWER SAVING TECHNIQUE FOR DIGITAL TO TIME CONVERTERS

BACKGROUND

Power control can be a common feature of wireless communication standards including, but not limited to, 3GPP standards. As an example, average power of a 3G uplink transmitter can be as high as +28 dBm. However, in most cases, the transmitter usually operates in the 0 dBm range. Having the entire transmit system of a wireless device ready and capable of operating at the high transmission power level can significantly limit the battery recharge life of mobile electronics.

OVERVIEW

This document discusses apparatus and methods for reducing energy consumption of digital-to-time converter (DTC) based transmitters. In an example, a wireless device can include a digital-to-time converter (DTC) configured to receive phase data information from a baseband processor and to provide a first modulation signal for generating a wireless signal, and a detector configured to detect an operating condition of the wireless device and to adjust a parameter of the DTC in response to a change in the operating condition.

This overview is intended to provide a general overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

The present inventors have recognized that when transmitter power is reduced or decreased, noise leaking in the receiver band scales accordingly. In certain examples, such as for polar transmitters, phase noise constraints can be relaxed without sacrificing reception quality. The inventors have also recognized other operating conditions that when detected can allow phase noise constraints to be relaxed. In addition, implementation of detecting and relaxing noise constraints can have the unexpected benefit of reducing the power consumption of the transmission system. In transmitters such as polar transmitters, for example, upon recognizing a condition that allows relaxing of transmitter noise constraints, the transmitter can enable smaller portions of the transmission system or can disable components that assist in maintaining tight noise constraints. In some examples, noise constraints can be relaxed by implementing adjustable digital-to-time converters (DTC), disabling portions of a DTC, adjusting a resolution of a DTC or noise shaper, or replacing a noise shaper in the processing path of a transmitter with multiple smaller noise shapers. In certain examples, as discussed below, each of these solutions can result in operating the transmitter at a lower, or decreased, power level at certain times, thus, conserving battery energy and extending the operating life of mobile communication devices between battery charging events.

Figure 1:
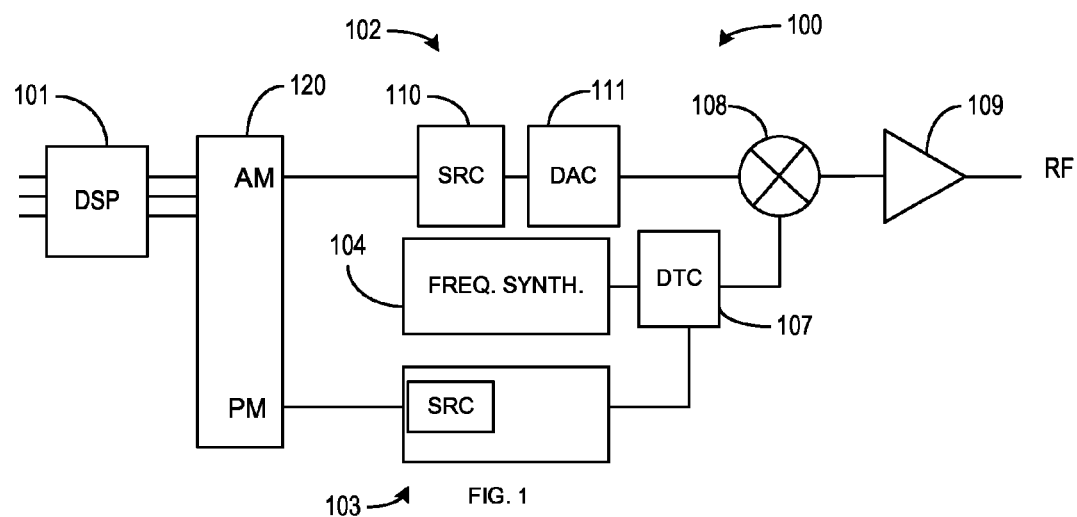
FIG. 1 illustrates generally an example DTC-based polar transmitter.

FIG. 1 illustrates generally an example transmitter 100 such as a polar transmitter. The transmitter 100 can include a processor 101, such as a digital signal processor (DSP), a cordic converter 120, an amplitude processing path 102, a phase processing path 103 including a frequency synthesizer 104 and a digital-to-time converter (DTC) 107. In certain examples, the transmitter can include a mixer 108 and a power amplifier 109. The processor 101 can receive or generate transmission information and encode the information into coordinate symbols. In certain examples, the processor 101 can monitor and detect changes in transmission conditions associated with the polar transmitter 100. In some examples, a processor or controller can include a detector module. In some examples, a transmitter can include a detector separate from the processor or controller. The cordic converter 120 can receive Cartesian symbols from the processor 101 and provide polar coordinate symbols including amplitude information (AM) for the amplitude processing path 102 of the polar transmitter 100 and phase information (PM) for the phase processing path 103 of the polar transmitter 100. In certain examples, the amplitude processing path 102 can include a sample rate converter 110 and an digital-to-analog converter 111. In some examples, the processed amplitude information can be restored to the envelope of the transmitter using the mixer 108. In certain examples, phase information can include analog or digital information related to phase modulation such as, but not limited to, phase angle information, frequency information, time information, or combinations thereof.

In certain examples, the phase processing path 103 can receive the digital phase information (PM) and can provide a modulation signal of a predetermined frequency using the frequency synthesizer 104 and a digital-to-time converter (DTC) 107. In certain examples, the amplitude information can be multiplied with the output of the DTC 107 at the mixer 108 to add the amplitude information to the envelope of the radio frequency signal provided by the DTC 107 to provide a reconstructed signal. In some examples, the reconstructed signal can be amplified and sent to an antenna using a power amplifier 109. The DTC 107 can operate to precisely position each edge of the modulation signal in the time domain. The higher the resolution of the DTC 107 the more accurate and less noisy the modulation signal can become.

Figure 2:
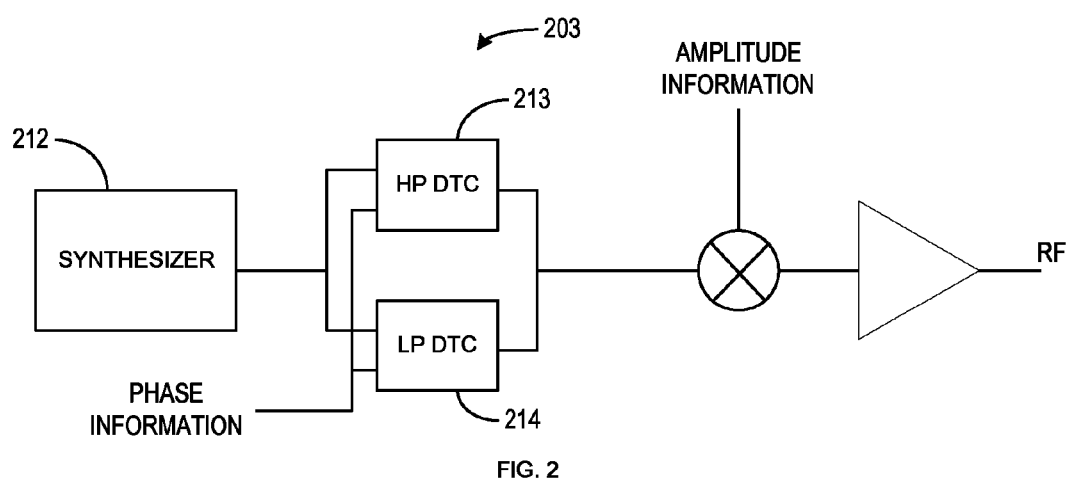
FIG. 2 illustrates generally an example phase processing path of a transmitter system that can be adjusted based on an operating condition of the transmitter.

FIG. 2 illustrates generally an example phase processing path 203 of a transmitter system that can be adjusted based on an operating condition of the transmitter. In certain examples, the phase processing path 203 can include a frequency synthesizer 212 and a two or more DTCs 213, 214. The DTCs 213, 214 receive phase information from a phase processing path and provide a phase modulation signal using the phase information and frequency information provided by the frequency synthesizer 212. In an example, a processor (not shown) associated with the transmitter can monitor and detect changes in transmission power. Upon detecting transmission power increasing or exceeding a threshold, the processor can enable a high-power DTC 213. In certain examples, when transmission power exceeds the threshold, a low-power DTC 214 can be disabled. Upon detecting transmission power falling below a second threshold, the processor can enable the low-power DTC 214 and can disable the high-power DTC 213. In certain examples, the high-power DTC 213 can include the low-power DTC 214 and thus upon detecting a change in transmission power, or other operating condition of the transmitter system, a portion of the high-power DTC 214 can be enabled or disabled. In general, as transmission power decreases, the noise constraints of a DTC can be relaxed, thus, a lower resolution and more power efficient DTC configuration can be used during periods of low power transmission. Other operating conditions where the noise constraints of a DTC based transmitter can be relaxed include, but are not limited to, a change in the presence or absence of a coexistence band, for example, of one or more other wireless protocols, and a change in the duplex distance of the transmitter. In certain examples, phase information can include analog or digital information related to phase modulation such as, but not limited to, phase angle information, frequency information, time information, or combinations thereof.

Figure 3:
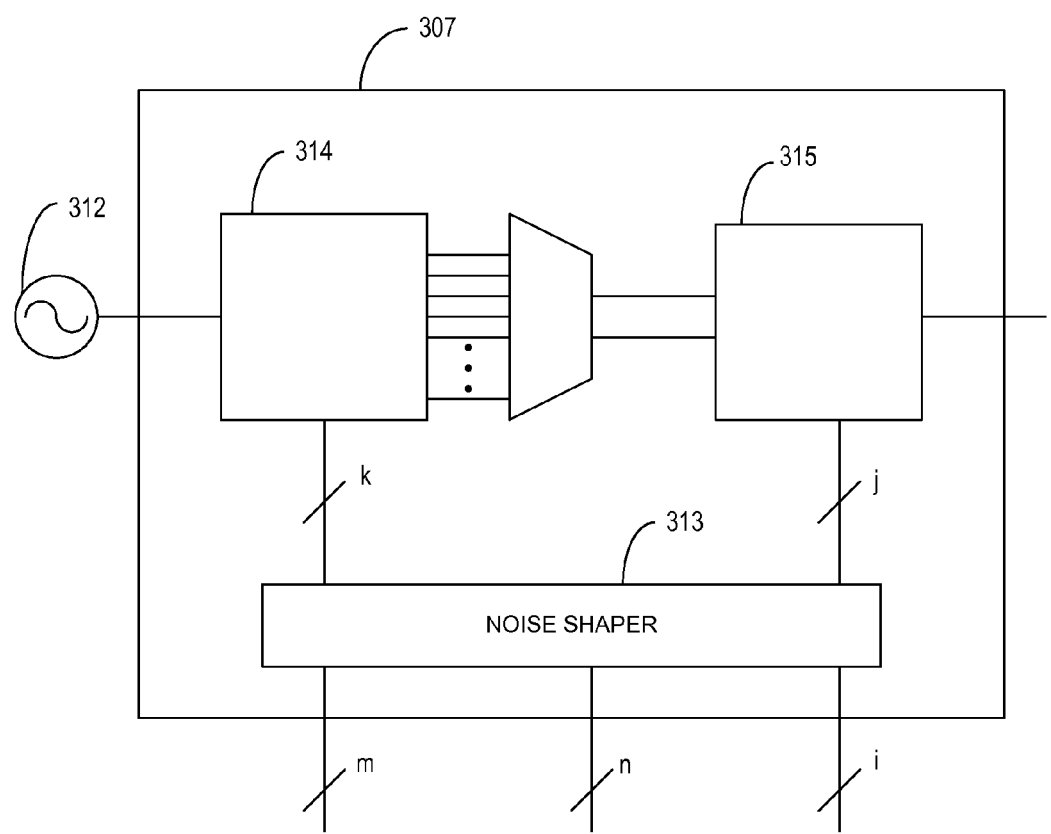
FIG. 3 illustrates generally an example DTC including an adjustable noise shaper.

FIG. 3 illustrates generally an example DTC 307 including an adjustable noise shaper 313. The DTC 307 can receive reference frequency information from a frequency synthesizer 312. The DTC 307 can include a coarse adjustment section 314 and a fine adjustment section 315 to adjust the modulation signal provided by the DTC 307. Each adjustment section 314, 315 of the DTC 307 can receive a number of bits (m, j) to adjust placement of edges of the modulation signal. In certain examples, a number of most significant bits (m, k) can be used to adjust the coarse adjustment section. In some examples, a number of bits (n) can be used to adjust an order of the adjustable noise shaper 313. In certain examples, for lower noise constraints, for example, the order of the adjustable noise shaper 313 can be varied to reduce the processing of one or more of the bits (m, i). In certain examples, the order of the adjustable noise shaper 313 can be varied to reduce the processing of one or more of the least significant bits (i, j) of the DTC 307. In certain examples, the processor of the transmitter, or a detector module, can vary the order of the adjustable noise shaper 313, or reduce the number of processed output bits of the noise shaper 313, based on a number of operating conditions, including but not limited to, the channel, output power, process variations, antenna voltage standing wave (VSWR) ration, a change in the presence or absence of a coexistence band, for example, of one or more other wireless protocols, a change in the duplex distance of the transmitter or combinations thereof. In certain examples, the noise shaper may only receive and process the least significant bits (i) to provide the fine adjustment bits (j) and the most significant bits (m) can be directly received by the course adjustment section 314.

Figure 4:
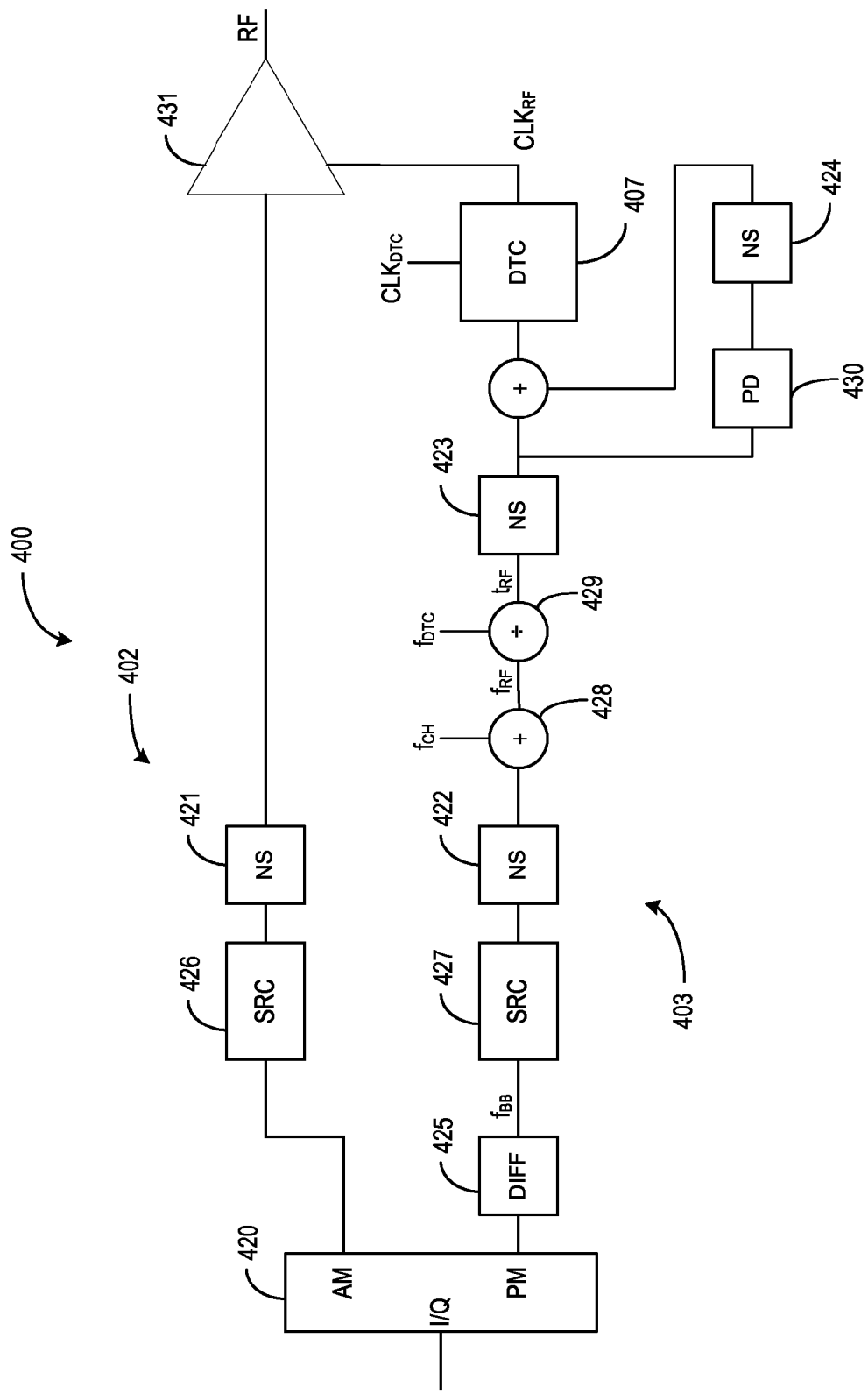
FIG. 4 illustrates generally an example, polar transmitter architecture for reducing power consumption.

FIG. 4 illustrates generally an example, transmitter architecture 400 for reducing power consumption. The transmitter architecture 400 can include an amplitude processing path 402 and a phase processing path 403 including a DTC 407. Noise shaping has been used to implement high signal-to-noise ratio (SNR) DACs with low accuracy analog components. However, noise shaping is typically only introduced directly before the DAC 431 and is not adapted dynamically. In certain examples, the transmitter architecture 400 can introduce adaptive noise shapers 421, 422, 423, 424 at non-traditional locations about the DTC. Adaptive noise shapers 421, 422, 423, 424 can provide noise shaping for the whole system instead of an individual component such as the DAC 431. As a result, total area and power consumption of the transmitter architecture 400 can be reduced compared to transmitters with a single fixed noise shaper before the DAC 431. In addition, power and area reductions can also be realized by the multiple-location adaptive noise shapers 421, 422, 423, 424 because they can be adjusted as transmission conditions change. Traditional topologies using fixed noise shapers located near a DAC required large areas to accommodate anticipated worst case conditions.

Referring to FIG. 4, the transmitter architecture 400 can receive a complex baseband signal information in Cartesian coordinates (I/Q) at a fixed sample rate (e.g., typically a few 100 MHz for wideband communication standards). The complex base band signal information can be converted into polar coordinates, or polar symbols, including for example, amplitude information (AM) and phase information (PM) such as phase angle information using a cordic converter 420. In certain examples, phase information can include analog or digital information related to phase modulation such as, but not limited to, phase angle information, frequency information, time information, or combinations thereof.

In the phase processing path 403, phase information can be differentiated to obtain complex baseband frequency ($f_{BB}$) using a differentiator 425. The fixed rate amplitude signal and frequency modulation signal can be converted to channel rate using sample rate converters 426, 427 which due to the inherent FM modulation of a polar signal is not constant. The baseband frequency ($f_{BB}$) can be converted to a radio frequency (RF) frequency ($f_{RF}$) by adding the channel center frequency ($f_{CH}$) at a summing node 428. In certain examples, as a digital-to-time converter can receive phase information such as time values, the RF frequency can be converted to an RF period ($t_{RF}$) by a divider 429 or divider module. The RF period ($t_{RF}$) can be used by the DTC to generate the modulated output signal ($CLK_{RF}$) using a reference frequency input clock (ClkDTC). The constant frequency input cock can be generated using a frequency synthesizer (not shown). In certain examples, a nonlinear pre-distortion block, module, or processing path 430 can be coupled to the phase processing path 403 and can be used to compensate analog nonlinearities of the digital code to analog delay relation of the DTC 407.

In certain examples, a digital-to-analog converter (DAC) 431 clocked with the modulated output signal ($CLK_{RF}$) of the DTC 407 and driven by the amplitude signal can generate the final output signal (RF). In some examples, the DAC 431 can include a power amplifier and can drive an antenna. In some examples, the DAC 431 can include a mixer. In some examples, the DAC 431 can include a mixer and a power amplifier. Some existing transmitter architectures employ fixed noise shapers just before the DAC 431 and the DTC 407 to reduce their quantization requirements. However, there are complex blocks (e.g. adders and dividers running at frequencies in the GHz range with bit widths in the 20 bit range) that additional noise shapers 422, 424 can be used to reduce the requirements for these traditionally located noise shapers 421, 423 resulting in significant area and power savings.

Furthermore, amplitude spectrum and phase spectrum differ significantly and quantization noise translates into output noise by different mechanisms. For example, the nonlinear pre-distortion block can change or modulate the FM spectrum (e.g., typically widens it), whereas its output level is typically low (e.g., nonlinearities are normally weak) compared to the FM signal. Therefore, employing additional noise shapers allows optimization to be targeted specifically for the spectral requirements of the location best influenced by each noise shaper. In certain examples, noise shaper roots can be placed where the roots can best help reduce noise at certain frequencies on the output.

In certain examples, order and type of roots of each noise shaper can be configured for the best tradeoff between saved circuit complexity and added noise shaper complexity. (e.g., the small signal at the output of the pre-distortion block can use few bits and therefore more complex transfer functions (more roots) can be achieved within a given complexity budget.) In certain examples, the 423 and 424 noise shapers can look completely different than tradition fixed noise shapers and can provide a lower complexity or a higher performance solution than a traditional fixed noise shaper placed after the nonlinearity compensation. In some examples, the 423 noise shaper can take advantage of the properties of a divider output signal, (e.g. the availability of the division remainder to improve performance.) such that a tailor series approximation of the division of the remainder by the frequency could be implemented to obtain the input of the noise shaper 423. For wideband standards, the tailor series approximation can be too inaccurate for the main signal path but still sufficiently good for calculating the noise shaper input.

Signal-to-noise (SNR) requirements for the whole system can change substantially during normal use. For examples, if a mobile phone is operated close to a base station, its own transmit power can be small, whereas the received signal can be strong. In certain examples, at low transmit power, the value of the AM signal can be small and therefore the signal to quantization noise ratio so low that in-band performance is degraded leading to a higher error vector magnitude (EVM). However, due to the low transmit power and the strong receive signal there can be little, if any, strong out of band requirements. In certain examples where the transmitter is far away from the base station, transmit power can be high and receive power can be small. Quantization noise can be small compared to the data signal, therefore, in-band performance can be good. However, there is a strong requirement to have low noise out of band to avoid disturbing the weak receive signal. A traditional noise shaper has to be optimized to support both scenarios.

An adaptive noise shaper can be configured to have the highest noise attenuation in-band and move the noise out of band in the close to base-station case and for having a notch in the receive band and shifting the noise in-band in the far from base station case.

Transmitters or devices that support multiple transmission or receptions bands provide another scenario in which adjustable noise shaping can support improved performance. Each band can have different noise requirements at different frequencies. Traditional noise shapers are optimized to provide coverage for all bands at the same time. An adaptive noise shaper can place the roots at the critical bands to provide noise attenuation where the noise shaping is needed.

In certain examples, the processor of a transmitter, or a detector module, can vary the order of one or more of the noise shapers 421, 422, 423, 424 based on a number of operating conditions, including but not limited to, the channel, output power, process variations, antenna voltage standing wave (VSWR) ration, a change in the presence or absence of a coexistence band, for example, of one or more other wireless protocols, a change in the duplex distance of the transmitter or combinations thereof. In certain examples, detecting a change in presence of coexistence band, such as of an additional wireless protocol, can include detecting the new presence of a coexistence band, as well as, detecting a change in how an existing coexistence band interacts with the polar wireless transmitter.

Figure 5:
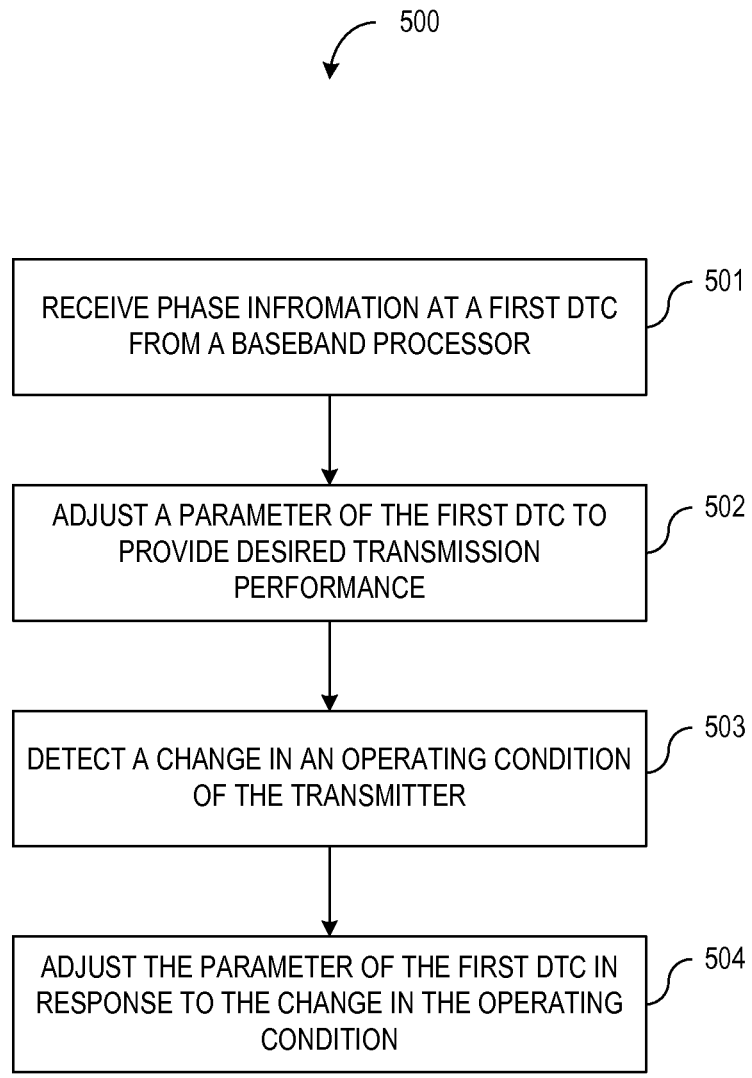
FIG. 5 illustrates generally a flowchart of an example method of operating a wireless transmitter to save power.

FIG. 5 illustrates generally a flowchart of an example method of operating a wireless transmitter to save power. At 501, the method can include receiving phase information from a baseband processor at a first DTC. At 502, the method can include adjusting a parameter of the first DTC in a frequency band of the phase information to provide a desired performance. At 503, the method can include detecting a first change in an operating condition of the wireless transmitter, and, at 504, the method can include adjusting the parameter of the first DTC in response to the first change. In certain examples, a DTC parameter can be adjusted to provide a desired performance. In some examples, upon detecting a change in an operating condition of the transmitter, the DTC parameter can be changed to relax a noise constraint while still maintaining the desired performance. Such a change can also result in an operating mode of the transmitter that uses less power. Operating conditions where noise constraints of a DTC based transmitter can be relaxed include, but are not limited to, a change in transmission power, a change in the presence or absence of a coexistence band, for example, of one or more other wireless protocols, and a change in the duplex distance of the transmitter. In certain examples, phase information can include analog or digital information related to phase modulation such as, but not limited to, phase angle information, frequency information, time information, or combinations thereof.

It is understood that the above concepts related to adjusting a DTC or a noise shaper in response to a changing operating condition can be applied to other electrical components, such as wireless receivers and other wireless transmitters in addition to polar transmitters without departing from the scope of the present subject matter.

ADDITIONAL NOTES

In Example 1, a wireless device can include a digital-to-time converter (DTC) configured to receive phase information from a baseband processor and to provide a first modulation signal for generating a wireless signal, and a detector configured to detect an operating condition of the wireless device and to adjust a parameter of the DTC in response to a change in the operating condition.

In Example 2, the detector of Example 1 optionally is configured to detect a change in transmission power of the wireless device, to enable or disable at least a portion of the DTC in response to the change in transmission power.

In Example 3, the detector of any one or more of Examples 1-2 optionally is configured to detect a change in transmission power of the wireless device, to disable at least a portion of the DTC in response to a decrease in transmission power, and to enable at least a portion of the DTC in response to an increase in transmission power.

In Example 4, the detector of any one or more of Examples 1-3 optionally is configured to detect a change in duplex distance of the wireless device, to enable or disable at least a portion of the DTC in response to the change in duplex distance.

In Example 5, the detector of any one or more of Examples 1-4 optionally is configured to detect a change in duplex distance of the wireless device, to disable at least a portion of the DTC in response to an increase in duplex distance, and to enable at least a portion of the DTC in response to a decrease in duplex distance.

In Example 6, the detector of any one or more of Examples 1-5 optionally is configured to detect a change in a presence of a coexistence band of an additional wireless protocol in a channel of the wireless device, and to enable or disable at least a portion of the DTC in response to the change in the presence of the coexistence band of the additional wireless protocol in the channel.

In Example 7, the detector of any one or more of Examples 1-6 optionally is configured to detect a change in a presence of a coexistence band of an additional wireless protocol in a channel of the wireless device, to disable at least a portion of the DTC in response to a decrease in the presence of the coexistence band, and to enable at least a portion of the DTC in response to an increase in the presence of the coexistence band.

In Example 8, the wireless device of any one or more of Examples 1-7 optionally includes a second DTC configured to receive the phase information from the baseband processor and to provide the first modulation signal for generating the wireless signal.

In Example 9, the detector of any one or more of Examples 1-8 optionally is configured to disable the second DTC when a transmission power of the wireless device exceeds a first threshold.

In Example 10, the detector of any one or more of Examples 1-9 optionally is configured to enable the first DTC when a transmission power of the wireless device exceeds a first threshold.

In Example 11, the detector of any one or more of Examples 1-10 optionally is configured to disable the first DTC when a transmission power of the wireless device falls below the first threshold.

In Example 12, the detector of any one or more of Examples 1-11 optionally is configured to enable the second DTC when a transmission power of the wireless device falls below the first threshold.

In Example 13, the detector of any one or more of Examples 1-12 optionally is configured to disable the second DTC when a duplex distance of the wireless device exceeds a first threshold.

In Example 14, the detector of any one or more of Examples 1-13 optionally is configured to enable the first DTC when a duplex distance of the wireless device exceeds a first threshold.

In Example 15, the detector of any one or more of Examples 1-14 optionally is configured to disable the first DTC when a duplex distance of the wireless device falls below the first threshold.

In Example 16, the detector of any one or more of Examples 1-15 optionally is configured to enable the second DTC when a duplex distance of the wireless device falls below the first threshold.

In Example 17, the detector of any one or more of Examples 1-16 optionally is configured to disable the second DTC when a measure of coexistence band presence in a channel of the wireless device exceeds a first threshold.

In Example 18, the detector of any one or more of Examples 1-17 optionally is configured to enable the first DTC when a measure of coexistence band presence in a channel of the wireless device exceeds a first threshold.

In Example 19, the detector of any one or more of Examples 1-18 optionally is configured to disable the first DTC when a measure of coexistence band presence in a channel of the wireless device falls below the first threshold.

In Example 20, the detector of any one or more of Examples 1-19 optionally is configured to enable the second DTC when a measure of coexistence band presence in a channel of the wireless device falls below the first threshold.

In Example 21, the DTC of any one or more of Examples 1-20 optionally includes a first noise shaper located in a process path of the DTC, and the detector of any one or more of Examples 1-20 optionally is configured to adjust a parameter of the first noise shaper in response to a change in the operating condition.

In Example 22, the first noise shaper of any one or more of Examples 1-21 optionally is integrated with the DTC.

In Example 23, the detector of any one or more of Examples 1-22 optionally is configured to detect a change in transmission power of the wireless device and to change an order of the first noise shaper or a number of active output bits of the noise shaper in response to the change in transmission power.

In Example 24, the detector of any one or more of Examples 1-23 optionally is configured to increase an order of the first noise shaper or increase the number of active output bits of the noise shaper in response to an increase in the transmission power, and the detector is optionally configured to decrease an order of the first noise shaper or decrease the number of active output bits of the noise shaper in response to a decrease in the transmission power.

In Example 25, the detector of any one or more of Examples 1-24 optionally is configured to detect a change in presence of a coexistence band of an additional wireless protocol in a channel of the wireless device and to change an order of the first noise shaper or a number of active output bits of the noise shaper in response to the change in presence of the coexistence band.

In Example 26, the detector of any one or more of Examples 1-3 optionally is configured to increase an order of the first noise shaper or increase the number of active output bits of the noise shaper in response to the presence of the coexistence band, and the detector optionally is configured to reduce the order of the first noise shaper or decrease the number of active output bits of the noise shaper in response to an absence of the coexistence band.

In Example 27, the detector of any one or more of Examples 1-26 optionally is configured to detect a change in duplex distance of a channel of the wireless device and to change an order of the first noise shaper or a number of active output bits of the noise shaper in response to the change in the duplex distance.

In Example 28, the detector of any one or more of Examples 1-27 optionally is configured to increase an order of the first noise shaper or increase the number of active output bits of the noise shaper in response to a decrease in the duplex distance, and the detector optionally is configured to reduce the order of the first noise shaper or decrease the number of active output bits of the noise shaper in response to an increase of the duplex distance.

In Example 29, a method for operating a wireless transmitter can include receiving phase information from a baseband processor at a first digital-to-time converter (DTC), adjusting a parameter of the first DTC in one or more frequency bands of the phase information, detecting a first change in a operating condition of the wireless transmitter, and adjusting a parameter of the first DTC in response to the first change.

In Example 30, the detecting a first change of any one or more of Examples 1-29 optionally includes detecting a change in transmission power of the wireless transmitter; and the adjusting a parameter of any one or more of Examples 1-29 optionally includes disabling a portion of the first DTC in response to the change in transmission power.

In Example 31, the detecting a first change of any one or more of Examples 1-30 optionally includes detecting a decrease in transmission power of the wireless transmitter, and the adjusting a parameter of any one or more of Examples 1-30 optionally includes disabling the first DTC and enabling a second DTC in response to the change in transmission power.

In Example 32, the detecting a first change of any one or more of Examples 1-31 optionally includes detecting an increase in transmission power of the wireless transmitter, and the adjusting a parameter of any one or more of Examples 1-31 optionally includes enabling the first DTC and disabling the second DTC in response to the change in transmission power.

In Example 33, the detecting a first change of any one or more of Examples 1-32 optionally includes detecting a change in duplex distance of the wireless transmitter, and the adjusting a parameter of any one or more of Examples 1-32 optionally includes disabling a portion of the first DTC in response to the change in duplex distance.

In Example 34, the detecting a first change of any one or more of Examples 1-33 optionally includes detecting a decrease in duplex distance of the wireless transmitter, and the adjusting a parameter of any one or more of Examples 1-33 optionally includes disabling the first DTC and enabling a second DTC in response to the change in duplex distance.

In Example 35, the detecting a first change of any one or more of Examples 1-34 optionally includes detecting an increase in duplex distance of the wireless transmitter, and the adjusting a parameter of any one or more of Examples 1-34 optionally includes enabling the first DTC and disabling the second DTC in response to the change in duplex distance.

In Example 36, the detecting a first change of any one or more of Examples 1-35 optionally includes detecting a change in a coexistence band of a channel, and the adjusting a parameter of any one or more of Examples 1-35 optionally includes disabling a portion of the first DTC in response to the change in the coexistence band.

In Example 37, the detecting a first change of any one or more of Examples 1-36 optionally includes detecting a decrease in presence of the coexistence band, and the adjusting a parameter of any one or more of Examples 1-36 optionally includes disabling the first DTC and enabling a second DTC in response to the decrease of presence of the coexistence band.

In Example 38, the detecting a first change of any one or more of Examples 1-37 optionally includes detecting an increase in presence of the coexistence band, and the adjusting a parameter of any one or more of Examples 1-37 optionally includes enabling the first DTC and disabling the second DTC in response to the increase in presence of the coexistence band.

In Example 39, the detecting a first change of any one or more of Examples 1-38 optionally includes detecting a change in transmission power of the wireless transmitter, the adjusting a parameter of any one or more of Examples 1-38 optionally includes increasing an order of a first noise shaper or increasing a number of active output bits of the noise shaper in response to an increase in the transmission power, and the adjusting a parameter optionally includes decreasing an order of the first noise shaper or decreasing a number of active output bits of the noise shaper in response to a decrease in the transmission power.

In Example 40, the adjusting a parameter of any one or more of Examples 1-39 optionally includes disabling the first noise shaper in response to an increase in the transmission power.

In Example 41, the detecting a first change of any one or more of Examples 1-40 optionally includes detecting a change in presence of a coexistence band of an additional wireless protocol in a channel of the wireless device, the adjusting a parameter of any one or more of Examples 1-40 optionally includes increasing an order of a first noise shaper or increasing a number of active output bits of the noise shaper in response to detecting an increased presence of the coexistence band, and the adjusting a parameter optionally includes decreasing an order of the first noise shaper or decreasing a number of active output bits of the noise shaper in response to detecting a decreased presence of the coexistence band.

In Example 42, the detecting a first change of any one or more of Examples 1-41 optionally includes detecting a change in duplex distance of a channel of the wireless device, the adjusting a parameter of any one or more of Examples 1-41 optionally includes increasing an order of a first noise shaper or increasing a number of active output bits of the noise shaper in response to a decrease in the duplex distance, and the adjusting a parameter optionally includes decreasing an order of the first noise shaper or decreasing a number of active output bits of the noise shaper in response to an increase in the duplex distance.

In Example 43, a wireless transmitter can include an amplitude processing path configure to receive a baseband signal and to provide a channel amplitude signal, a phase processing path configured to receive the baseband signal and to provide a channel phase signal, a digital-to-time converter (DTC) configured to provide a frequency modulated output clock signal using the channel phase signal, a divider module located in the phase processing path prior to the DTC, first and second noise shapers located in the phase processing path prior to the DTC, wherein the first noise shaper is located prior to the divider, and wherein the second noise shaper is located after the divider, and a mixer configured to receive the channel amplitude signal and the frequency modulated clock signal and to provide a reconstructed signal to a power amplifier for amplification.

In Example 44, the wireless transmitter of any one or more of Examples 1-43 optionally includes a summing node, and a pre-distortion module configured to modulate a spectrum of the phase processing path using a pre-distortion processing path coupled to the phase processing path at the summing node.

In Example 45, the wireless transmitter of any one or more of Examples 1-44 optionally includes a third noise shaper located in the pre-distortion processing path.

In Example 46, the wireless transmitter of any one or more of Examples 1-45 optionally includes a fourth noise shaper located in the amplitude processing path.

Example 47 can include, or can optionally be combined with any portion or combination of any portions of any one or more of Examples 1 through 46 to include, subject matter that can include means for performing any one or more of the functions of Examples 1 through 46, or a machine-readable medium including instructions that, when performed by a machine, cause the machine to perform any one or more of the functions of Examples 1 through 46.

The above detailed description includes references to the accompanying drawings, which form a part of the detailed description. The drawings show, by way of illustration, specific embodiments in which the invention can be practiced. These embodiments are also referred to herein as "examples." All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

What is claimed is:

1. A wireless device comprising:
    a digital-to-time converter (DTC) configured to receive phase information from a baseband processor and to provide a first modulation signal for generating a wireless signal;
    a detector configured to detect a change in transmission power of the wireless device, and to enable or disable at least a portion of the DTC in response to the change in transmission power;
    wherein the DTC includes a first noise shaper located in a process path of the DTC; and
    wherein the detector is configured to adjust a parameter of the first noise shaper in response to the change in the transmission power.

2. The wireless device of claim 1, wherein the detector is configured to to disable at least a portion of the DTC in response to a decrease in transmission power, and to enable at least a portion of the DTC in response to an increase in transmission power.

3. The wireless device of claim 1, further comprising a second DTC configured to receive the phase information from the baseband processor and to provide the first modulation signal for generating the wireless signal.

4. The wireless device of claim 3, wherein the detector is configured to disable the second DTC if a transmission power of the wireless device exceeds a first threshold.

5. The wireless device of claim 3, wherein the detector is configured to disable the first DTC if a transmission power of the wireless device falls below the first threshold.

6. The wireless device of claim 1, wherein the first noise shaper is integrated with the DTC.

7. The wireless device of claim 1, wherein the detector is configured to change an order of the first noise shaper in response to the change in transmission power.

8. The wireless device of claim 1, wherein the detector is configured to increase an order of the first noise shaper in response to an increase in the transmission power; and
    wherein the detector is configured to decrease an order of the first noise shaper in response to a decrease in the transmission power.

9. The wireless device of claim 1, wherein the detector is configured to detect a change in presence of a coexistence band of an additional wireless protocol in a channel of the wireless device and to change an order of the first noise shaper in response to the change in presence of the coexistence band.

10. The wireless device of claim 9, wherein the detector is configured to increase an order of the first noise shaper in response to the presence of the coexistence band; and
    wherein the detector is configured to reduce the order of the first noise shaper in response to an absence of the coexistence band.

11. The wireless device of claim 1, wherein the detector is configured to detect a change in duplex distance of a channel of the wireless device and to change an order of the first noise shaper in response to the change in the duplex distance.

12. The wireless device of claim 11, wherein the detector is configured to increase an order of the first noise shaper in response to a decrease in the duplex distance; and
    wherein the detector is configured to reduce the order of the first noise shaper in response to an increase of the duplex distance.

13. A method for operating a wireless transmitter comprising:
    receiving phase information from a baseband processor at a first digital-to-time converter (DTC);
    adjusting a parameter of the first DTC in one or more frequency bands of the phase information;
    detecting a change in transmission power of the wireless transmitter;
    enabling or disabling at least a portion of the first DTC in response to the change in transmission power;
    increasing an order of a first noise shaper in response to an increase in the transmission power; and
    wherein adjusting a parameter includes decreasing an order of the first noise shaper in response to a decrease in the transmission power.

14. The method of claim 13, wherein the detecting a change in transmission power includes detecting a decrease in transmission power of the wireless transmitter; and
    wherein the enabling or disabling at least a portion of the first DTC includes disabling the first DTC and enabling a second DTC.

15. The method of claim 14, wherein the detecting a change in transmission power includes detecting an increase in transmission power of the wireless transmitter; and
    wherein the enabling or disabling at least a portion of the first DTC includes enabling the first DTC and disabling the second DTC.

16. The method of claim 13, wherein adjusting a parameter includes disabling the first noise shaper in response to an increase in the transmission power.

17. The method of claim 13, including detecting a change in presence of a coexistence band of an additional wireless protocol in a channel of the wireless device;
    increasing an order of a first noise shaper in response to detecting an increased presence of the coexistence band; and
    decreasing an order of the first noise shaper in response to detecting a decreased presence of the coexistence band.

18. The method of claim 13, including detecting a change in duplex distance of a channel of the wireless device;
    increasing an order of a first noise shaper in response to a decrease in the duplex distance; and
    decreasing an order of the first noise shaper in response to an increase in the duplex distance.

19. A method for operating a wireless transmitter comprising:
    receiving phase information from a baseband processor at a first digital-to-time converter (DTC);
    adjusting a parameter of the first DTC in one or more frequency bands of the phase information;
    detecting a change in transmission power of the wireless transmitter;
    enabling or disabling at least a portion of the first DTC in response to the change in transmission power;
    detecting a change in presence of a coexistence band of an additional wireless protocol in a channel of the wireless device;
    increasing an order of a first noise shaper in response to detecting an increased presence of the coexistence band; and
    decreasing an order of the first noise shaper in response to detecting a decreased presence of the coexistence band.

20. A method for operating a wireless transmitter comprising:
    receiving phase information from a baseband processor at a first digital-to-time converter (DTC);
    adjusting a parameter of the first DTC in one or more frequency bands of the phase information;
    detecting a change in transmission power of the wireless transmitter;
    enabling or disabling at least a portion of the first DTC in response to the change in transmission power;
    detecting a change in duplex distance of a channel of the wireless device;
    increasing an order of a first noise shaper in response to a decrease in the duplex distance; and
    decreasing an order of the first noise shaper in response to an increase in the duplex distance.

\* \* \* \* \*

UNITED STATES PATENT AND TRADEMARK OFFICE
CERTIFICATE OF CORRECTION

PATENT NO. : 9,847,676 B2
APPLICATION NO. : 14/039996
DATED : December 19, 2017
INVENTOR(S) : Madoglio et al.

It is certified that error appears in the above-identified patent and that said Letters Patent is hereby corrected as shown below:

In the Claims

In Column 11, Line 64, in Claim 2, delete "to to" and insert --to-- therefor

Signed and Sealed this
Twenty-eighth Day of May, 2019

Andrei Iancu
*Director of the United States Patent and Trademark Office*